United States Patent
Morgan et al.

(10) Patent No.: US 9,621,609 B2
(45) Date of Patent: *Apr. 11, 2017

(54) SYSTEM AND METHOD FOR CONTENT STREAMING WITH FEATURE DETECTION

(71) Applicant: AMARONE PARTNERS, LLC, Chicago, IL (US)

(72) Inventors: Russell Morgan, Portland, OR (US); Philip Kalmes, Brooklyn, NY (US); Charles Conklin, Brooklyn, NY (US); Alex Padmos, New York, NY (US)

(73) Assignee: AMARONE PARTNERS, LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/048,566

(22) Filed: Feb. 19, 2016

(65) Prior Publication Data

US 2016/0381107 A1    Dec. 29, 2016

Related U.S. Application Data (63) Continuation of application No. 14/749,929, filed on Jun. 25, 2015, now Pat. No. 9,270,724.

(51) Int. Cl.
*G06F 15/16* (2006.01)
*H04L 29/06* (2006.01)
*H04L 29/08* (2006.01)

(52) U.S. Cl.
CPC ............. *H04L 65/60* (2013.01); *H04L 63/06* (2013.01); *H04L 67/02* (2013.01); *H04L 67/06* (2013.01)

(58) Field of Classification Search
CPC ... H04L 65/60; H04L 65/602; H04L 67/1095; G06F 3/0304; G06F 17/28; G06F 15/16
(Continued)

(56) References Cited

U.S. PATENT DOCUMENTS

2010/0317420 A1* 12/2010 Hoffberg ............ G06Q 30/0207 463/1
2011/0035219 A1* 2/2011 Kadirkamanathan ...................... G10L 15/005 704/239

(Continued)

OTHER PUBLICATIONS

Apple Inc., "HTTP Streaming Architecture", https://developer.apple.com/library/mac/documentation/NetworkingInternet/Conceptual/StreamingMediaGuide/HTTPStreamingArchitecture/HTTPStreamingArchitecture.html, Feb. 11, 2014. Feb. 11, 2014.

(Continued)

*Primary Examiner* — Tesfay Yohannes
(74) *Attorney, Agent, or Firm* — Howison & Arnott, LLP (57) ABSTRACT

A system and method for content streaming with feature detection, comprising determining a streaming format compatibility criteria of a remote web browser, determining a content selection from a list of one or more content selections, receiving at a content server a streaming request, streaming the content selection, the streaming including dividing a source content into a plurality of segment files, encrypting the plurality of segment files, sending a manifest file from the content server to the remote web browser, receiving requests at the content server for each of the plurality of segment files and a decryption key, sending from the content server each one of the requested plurality of segment files and the decryption key, and selecting the next content selection in the list until the last content selection is selected and streamed.

20 Claims, 9 Drawing Sheets

(58) Field of Classification Search
USPC .......................... 709/202, 217, 219; 725/10
See application file for complete search history.

(56) References Cited

U.S. PATENT DOCUMENTS

| | | | |
|---|---|---|---|
| 2013/0159021 A1* | 6/2013 | Felsher | G06F 19/322 705/3 |
| 2013/0201283 A1* | 8/2013 | Broberg | H04N 7/0882 348/43 |
| 2014/0304376 A1* | 10/2014 | Branam | G06F 17/30038 709/219 |
| 2015/0120953 A1* | 4/2015 | Crowe | H04L 65/60 709/231 |
| 2015/0134772 A1* | 5/2015 | Heinz, II | G06T 11/40 709/217 |
| 2015/0229685 A1* | 8/2015 | Brebion | H04L 65/4076 709/202 |
| 2015/0242525 A1* | 8/2015 | Perlegos | G06F 17/30893 707/782 |
| 2015/0269421 A1* | 9/2015 | Liu | G06K 9/629 382/118 |
| 2015/0326922 A1* | 11/2015 | Givon | H04N 21/44218 725/10 |

OTHER PUBLICATIONS

Cisco, "HTTP versus RTMP: Which Way to Go and Why?", http://www.cisco.com/c/en/us/products/collateral/video/as5100-series-media-processor/white_paper_c11-675935.html, retrieved Jun. 15, 2015. Jun. 15, 2015.

Jan Ozer, "What is HLS (HTTP Live Streaming)?", http://www.streamingmedia.com/Articles/Editorial/What-Is-.../What-is-HLS-(HTTP-Live-Streaming)-78221.aspx, Oct. 14, 2011. Oct. 14, 2011.

* cited by examiner

SYSTEM AND METHOD FOR CONTENT STREAMING WITH FEATURE DETECTION

CROSS REFERENCE TO RELATED APPLICATIONS

This application is a continuation of U.S. patent application Ser. No. 14/749,929, filed Jun. 25, 2015, entitled SYSTEM AND METHOD FOR CONTENT STREAMING WITH FEATURE DETECTION.

TECHNICAL FIELD

The following disclosure related to digital content streaming and, more specifically, to HTTP Live Streaming (HLS) of digital content.

BACKGROUND

Streaming digital content over the Internet has developed into one of the most preferred and effective ways of delivering digital content to audiences around the globe. However, various difficulties arise in delivering content to multiple platforms, each platform potentially having different browsers and different versions of those browsers. Compatibility issues thus arise and streaming content providers have to provide some way to deliver content to as many users as possible in a secure fashion. One of the most popular streaming formats is Flash streaming. In most cases, Flash is available on personal computers, but not available for mobile devices.

HTTP Live Streaming is a streaming format originally designed for use in streaming video content. As a result, HTTP Live Streaming does not account for separate items of content to be consumed in sequence, such as in a playlist. Therefore, in order to accommodate playlists, other measures must be implemented.

SUMMARY

In one aspect thereof, a system and method for content streaming with feature detection is provided. The system and method comprises storing a source content to be streamed on a content server disposed on a network, determining a streaming format compatibility criteria of a remote web browser to determine if the remote web browser is HTTP Live Streaming compatible, and, if so, selecting by a content presentation interface disposed in a webpage loaded in the remote web browser a content selection from a list within the webpage of one or more content selections, each content selection including an identification of content, a location of the content server, and an access token, receiving at the content server a HTTP Live Streaming request from the remote web browser for the content selection, the request including the identification of the content and the location of the content server, streaming the content selection from the content server to the remote web browser via the network. The streaming includes dividing the source content into a plurality of segment files, encrypting the plurality of segment files, sending a manifest file from the content server to the remote web browser containing links to provide access to the plurality of segment files and to a decryption key associated with the plurality of segment files, receiving requests at the content server from the remote web browser for each of the plurality of segment files and for the decryption key from the remote web browser; and sending from the content server to the remote web browser each one of the requested plurality of segment files and the requested decryption key, to be used to decrypt each of the plurality of segment files, as each request for each of the plurality of segment files is received, and repeating the streaming steps, while playback is performed until the last content selection is selected and streamed, in order to buffer additional content to allow for continuous playback of the list of one or more content selections.

BRIEF DESCRIPTION OF THE DRAWINGS

For a more complete understanding, reference is now made to the following description taken in conjunction with the accompanying Drawings in which.

DETAILED DESCRIPTION

Referring now to the drawings, wherein like reference numbers are used herein to designate like elements throughout, the various views and embodiments of a system and method for content streaming with feature detection are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Figure 1:
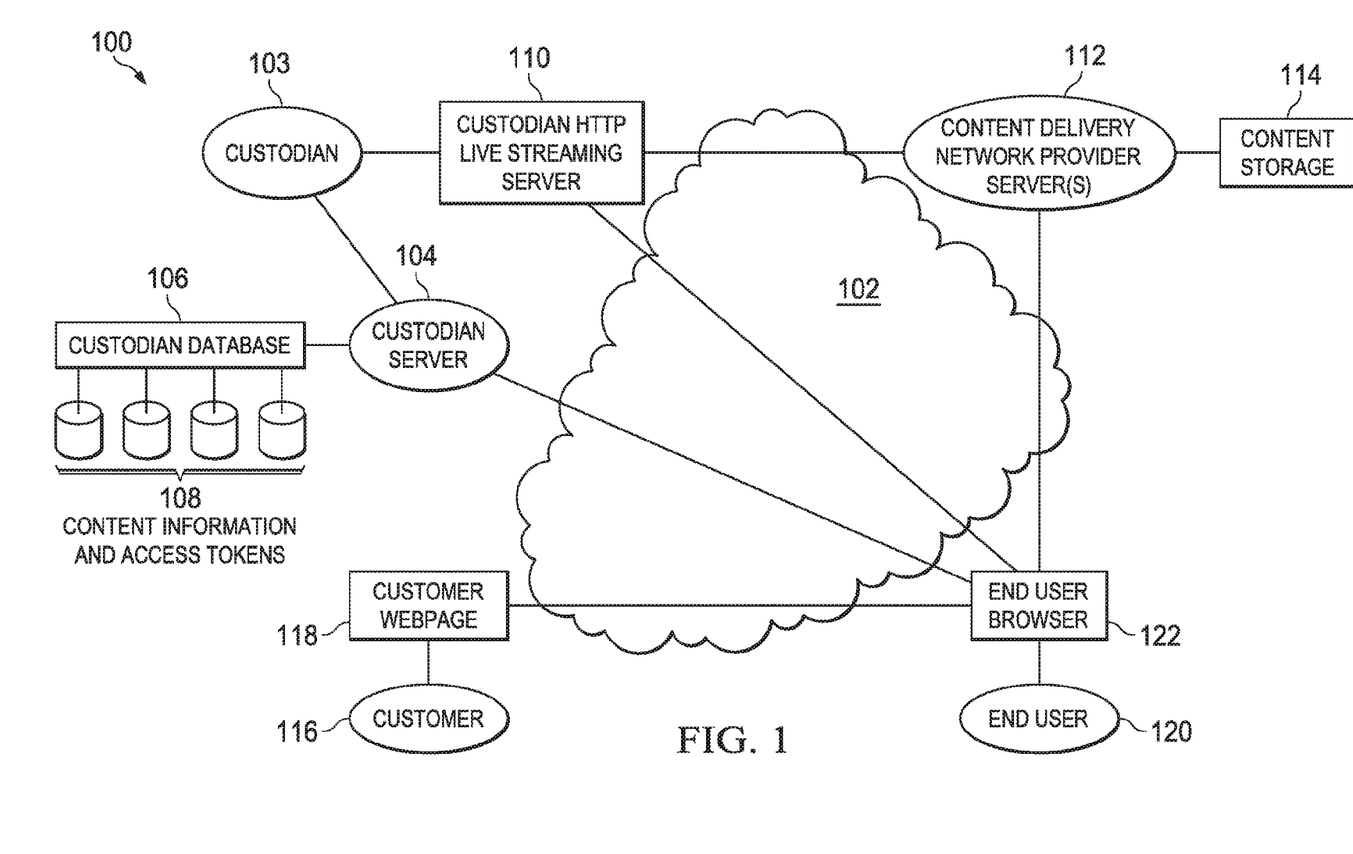
FIG. 1 illustrates a diagrammatic representation of a digital content streaming network.

Referring now to FIG. 1, there is illustrated a diagrammatic representation of a digital content streaming network 100. The network 100 includes an IP network 102 to accommodate communication between the various nodes in the network 100. The network 100 further includes a custodian server 104, which includes a custodian database 106, maintained by a custodian 103. The custodian database 106 may contain various database records 108 that include identifying information relating to potential streaming content, as well as copies of access tokens that may be used to authenticate access to said streaming content. The network 100 also includes a custodian HTTP Live Streaming (HLS) server 110, also maintained by the custodian 103, to facilitate HLS streaming of digital content. The network 100 may also include a Content Delivery Network (CDN) provider server(s) 112 having content storage 114. The CDN provider server(s) 112 may be maintained by a third-party having an agreement with the custodian 103 to provide servers for storage and streaming of content on behalf of the custodian 103. This type of arrangement is beneficial to the custodian 103 as it allows the custodian 103 to avoid performing all storage of content and all streaming services at the custodian server 104 or the custodian HLS server 110, as well as providing established and reliable servers for those wishing to use the custodian's streaming services.

It will be appreciated by those skilled in the art that the CDN provider server(s) 112 are not necessary for storage and streaming of content, as the custodian server 104 or the custodian HLS server 110 could be used instead, but merely provide convenience and more affordability to the custodian 103. The network 100 also may include a customer 116 having a customer webpage 118. The customer would typically be a customer of the custodian 103. In this type of arrangement, the custodian 103 would allow streaming content to be accessed by way of an end user 120 accessing the customer webpage 118 via an end user browser 122. The end user browser 122 is a web browser, such as Internet Explorer, Safari, Firefox, Google Chrome, or another browser. The customer 116 would be provided with access tokens associated with specific content stored on the custodian server 104, the custodian HLS server 110, or the CDN provider server 112. The database records 108 contain copies of the access tokens in relation to content information also stored in the database records 108. The access tokens allow one to access streaming content when provided to the custodian server 104. The customer webpage 118 has web scripting written in a scripting language, such as Perl, Python, or JavaScript, for example, to check the streaming format supported by the end user browser 122, as well as to provide the access tokens to the end user browser 122. Additionally, the customer webpage 118 will typically contain an interface for presenting streaming content to the end user 120.

Still referring to FIG. 1, the end user 120 utilizes the end user browser 122 to access the customer webpage 118. The customer webpage 118 may be generated and served to the end user browser 122 by a web server, by the customer 116, or another third party provider. Once the customer webpage 118 is loaded in the end user browser 122, all subsequent communications to facilitate streaming no longer require participation from the customer 116. The customer webpage 118 loaded in the end user browser 122 will determine whether the end user browser supports available streaming formats, such as Flash, HLS, MPEG-Dash, or other streaming formats. The customer webpage 118 will also provide access tokens to the end user browser 122. The end user browser 118 then contacts the custodian server 104 to start the streaming process. Throughout the streaming process, the end user browser 122 may communicate with the custodian HLS server 110, the CDN provider server 112, or both, in addition to the custodian server 104.

Figure 2:
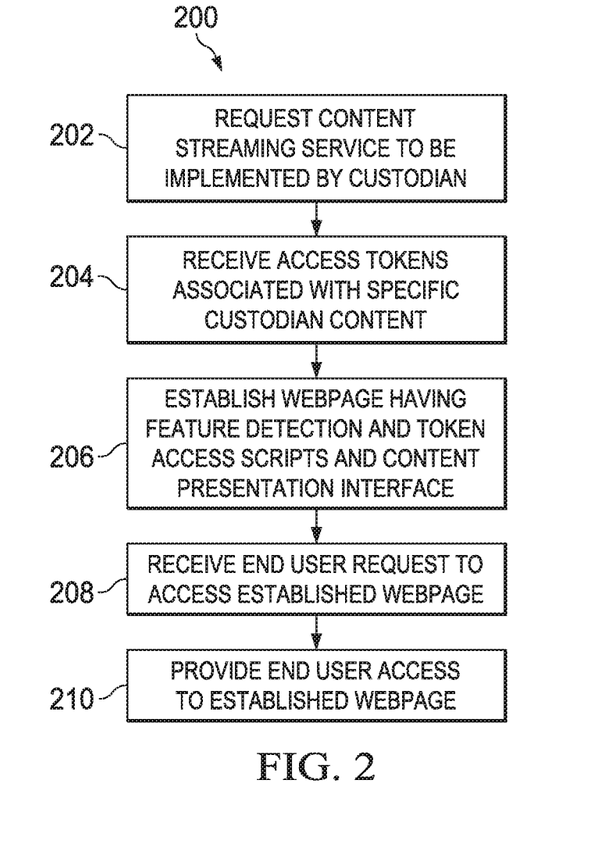
FIG. 2 illustrates a flow diagram of one embodiment of a customer webpage development process.

Referring now to FIG. 2, there is illustrated a flow diagram of one embodiment of a customer webpage development process 200. At step 202, the customer 116 requests an arrangement for a content streaming service to be implemented by custodian 103. At step 204, the customer 116 receives access tokens associated with the specific content from the custodian 103. The access tokens preferably have a set duration of time before they expire, in order to provide that the custodian 103 is not streaming content after an agreement with a customer has reached its termination date. Further, one access token may provide access to multiple pieces of content to be streamed, or multiple access tokens may be provided that are each associated with a single piece of content. At step 206, the customer 116 establishes the customer webpage 118 wherein the customer webpage 118 includes feature detection and token access scripts, as well as a content presentation interface, such as an audio player, for example. The content presentation interface would be constructed using available web design methods, such as being constructed using HTML. At step 208, the customer webpage 118 receives a request from the end user browser 122 to access the customer webpage 208. At step 210, the end user browser 122 accesses the customer webpage 118. It will be appreciated by one skilled in the art that other means of streaming content may be provided, even without requiring a customer 116. For instance, the custodian 103 may produce its own website having a content presentation interface, or it may provide a content presentation interface in some other format, such as in an email. The email would then be sent to certain recipients and would stream content once opened through the content presentation interface. The customer 116 may also choose to use the email method to reach the end user 120, rather than through the customer webpage 118. These methods of providing a content presentation interface allows the customer 116 to provide for content to be streamed in a secure and encrypted manner through the customer webpage 208, or other means, without the need of developing a PC or mobile application to provide the content to the user. This is critical because a content provider licensing their content for streaming purposes typically desires that content be streamed in a secure and encrypted manner, which HLS streaming provides, as described hereinbelow. Thus, the customer 116 saves on the cost of developing a stand-alone application, while the content provider's desire that content be streamed in a secure and encrypted manner is fulfilled.

In addition to utilizing email to reach the end user 120, the customer 116 may also use social media applications, as well. For example, the content presentation interface may be embedded in a social media process, such as a posting by a user on a social media website. The posting would include the content presentation interface, and others who view the post would be able to interact with the content presentation interface in order to stream content. It will be appreciated by one skilled in the art that the content presentation interface may be used in various media and in various formats, without being restricted to the example provided herein.

Figure 3A:
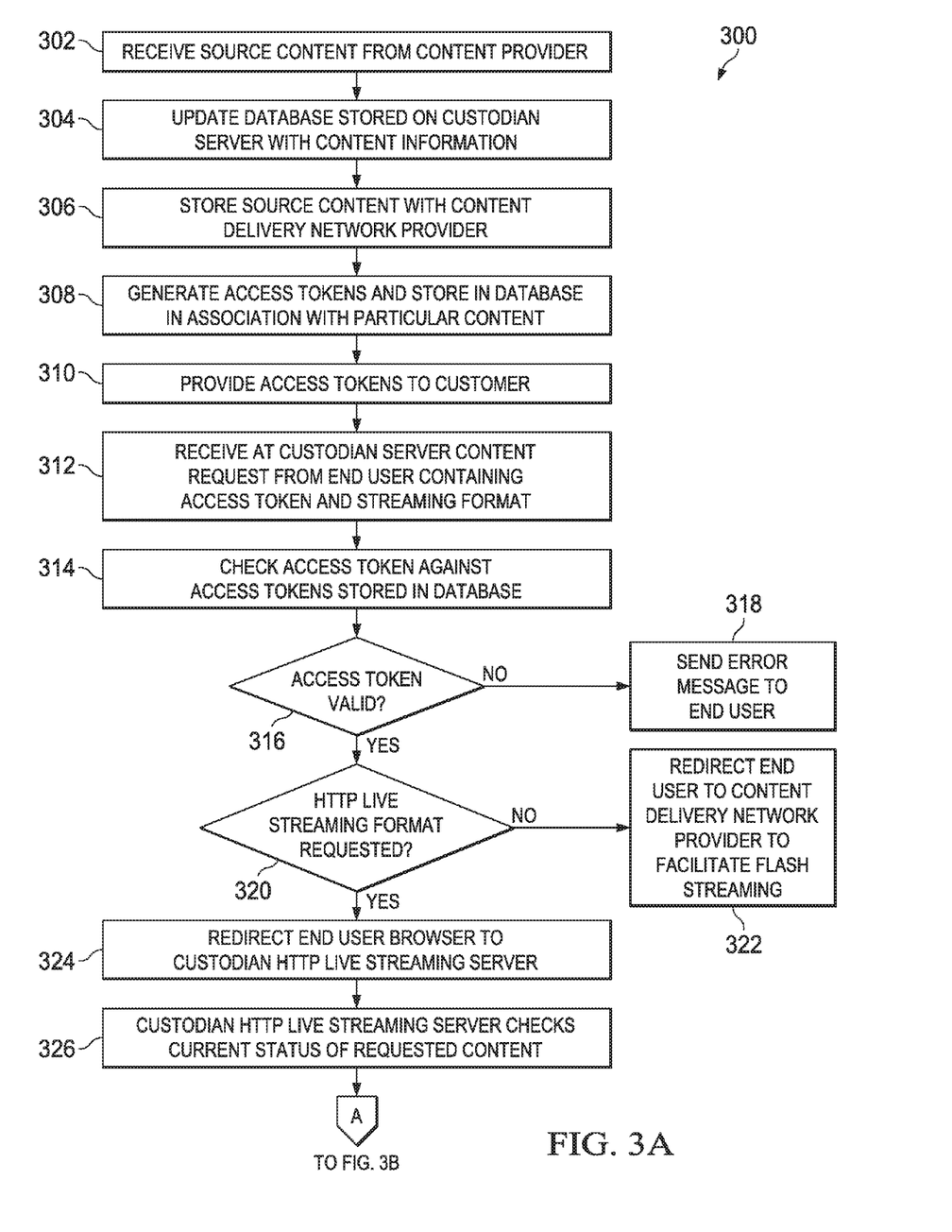
FIG. 3A illustrates a flow diagram of one embodiment of a custodian content streaming process.
Figure 3B:
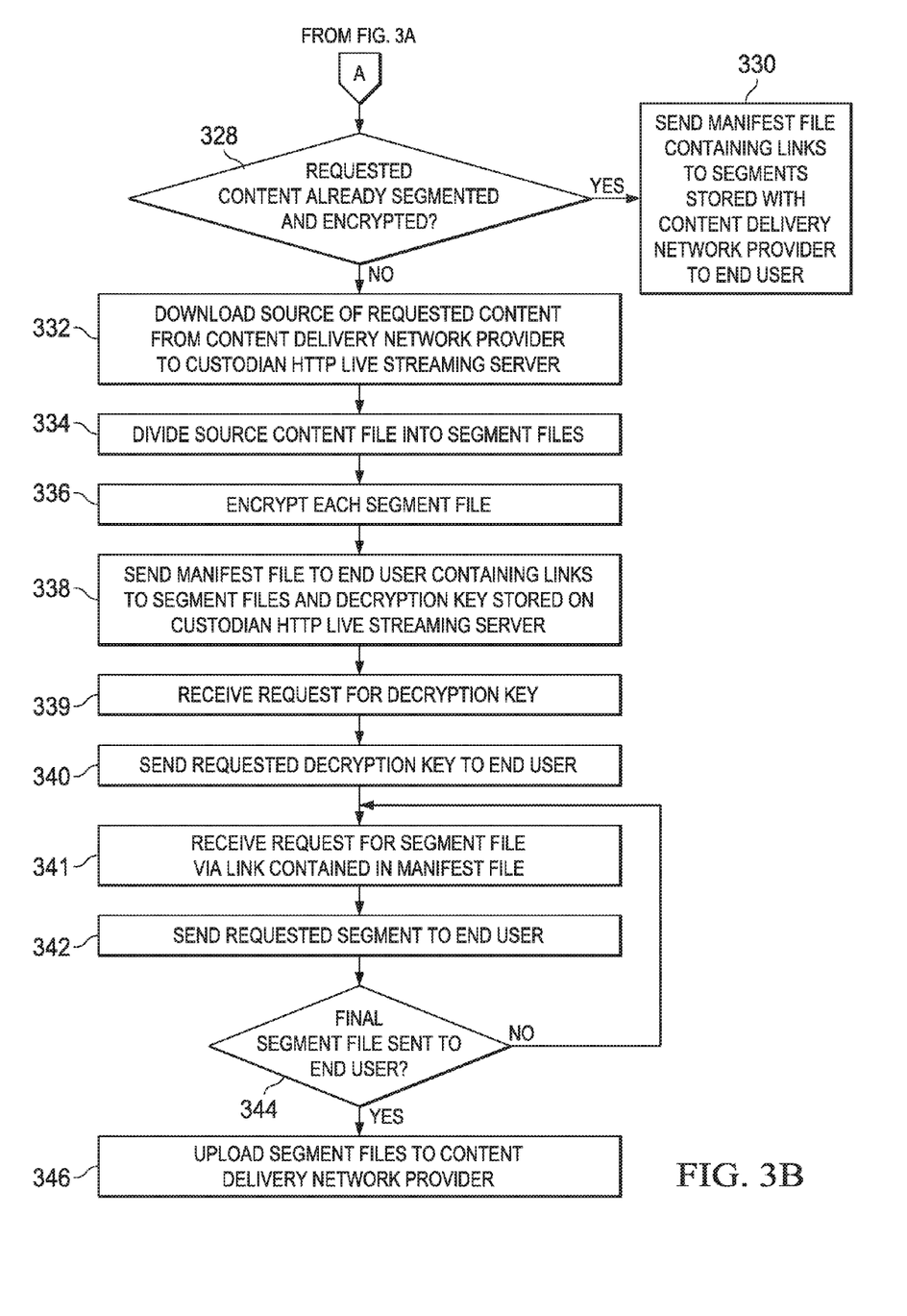
FIG. 3B illustrates a continuation of the flow diagram of FIG. 3A.

Referring now to FIGS. 3A and 3B, there is illustrated a flow diagram of one embodiment of a custodian content streaming process 300. At step 302, the custodian 103 receives source content from a content provider. Typically, the source content is in a digital format, such as MP3 files. The content provider may provide a catalog of content to the custodian 103, or individual pieces of content. The content provided may be various types of content, such as audio content, video content, or other forms of content for streaming. At step 304, the database records 108 of the custodian database 106 are updated with information related to the content provided by the content provider, such as the title, length, and other identifying information. At step 306, the custodian 103 stores the content provided by the content provider on the CDN provider server(s) 112. Preferably, the custodian 103 does not have to permanently store any content on either the custodian server 104 or the custodian HLS server 110, although content may be stored on the custodian server 104 or the custodian HLS server 110 without departing from the present inventive concept. At step 308, the custodian 103 generates access tokens and stores the access tokens in the custodian database 106 in association with particular content to be streamed. At step 310, the custodian 103 provides the access tokens to the customer 116 in order to provide access to content to be streamed to the end user 122 visiting the customer webpage 118. At step 312, the custodian server 104 receives a request from the end user browser 122 containing the access token and the streaming format capability as determined by the customer webpage 118. At step 314, the custodian server 104 checks the access token received from the end user browser 122 against the access token stored in the custodian database 106. At step 316, if the access token is deemed valid, that is, if the access token matches an access token stored in the custodian database 106 and the access token has not expired, the process moves on to step 320. If the access token is deemed invalid, the process moves to step 318. At step 318, the custodian server 104 sends a message to the end user browser 122 stating that the access token is not valid, or some other applicable message.

If the token is valid, at step 320, the streaming format compatibility that was received by the custodian server 104 is checked. If HLS streaming was not requested, but some other streaming format was requested, such as Flash, or another streaming format, the process may move to step 322 where the custodian server 104 redirects the end user browser 122 to the CDN provider server(s) 112 in order for the CDN provider server(s) 112 to facilitate the rest of the streaming process. It will be appreciated by one skilled in the art that the custodian 103 could provide the streaming of the Flash content, if the custodian 103 so desired. Streaming formats other than Flash, such as MPEG-Dash, may advance the process to step 322, to allow the CDN server(s) 112 to facilitate the rest of the streaming process, or the process may continue to step 324. If it is determined that HLS streaming is requested, the process moves to step 324. It will be appreciated that other streaming formats, such as MPEG-Dash, may also cause the process to move to step 324, and thus follow the same process as an HLS streaming request, instead of advancing to step 322. At step 324, the end user browser 122 is redirected to the custodian HLS server 110. At step 326, the custodian HLS server checks the current status of the content to be streamed. At step 328, it is determined if the requested content is already segmented and encrypted, and, thus, is already ready to be streamed to the end user browser 122. If the requested content is already segmented and encrypted, the process moves to step 330 where the custodian HLS server 110 sends a manifest file, also known as an index file, to the end user browser 122 containing the links to the segment files which are stored on the CDN provider server(s) 112. The CDN provider server(s) 112 would handle the streaming process from that point. If, at step 328, it is determined that the content is not already segmented and encrypted, the process moves to step 332.

At step 332, the custodian HLS server 110 downloads the source file of the requested content from the CDN provider server(s) 112. At step 334, the custodian HLS server 110 divides the downloaded file into segment files. The file would be divided into segment files containing content of equal length, such as 10 second segments. At step 336, the custodian HLS server encrypts the segment files via OpenSSL, or some other cryptology library. At step 338, the custodian server 110 sends a manifest file to the end user browser 122 containing links to the segment files currently stored on the custodian HLS server 110. The manifest file also contains a link to a decryption key, and information concerning each segment file, such as the length, in seconds, of the segment file. At step 339, the custodian HLS server 110 receives a request for the decryption key. At step 340, the custodian HLS server 110 sends the requested decryption key to the end user browser 122. At step 341, the custodian HLS server 110 receives a request for a segment by the end user browser 122 by activating the link to that segment in the manifest file. At step 342, the custodian HLS server 110 sends the requested segment file to the end user browser 122. At step 344, it is determined whether the segment sent in step 342 was the final segment in the manifest file, if it was not the process moves back to step 340 in order to send the next segment. If it was the final segment in the manifest file, the process moves to step 346. At step 346, the segmented files produced in step 334 are uploaded to the CDN provider server(s) 112. This allows the CDN provider server(s) 112 to handle subsequent requests for this same piece of content. Essentially, this enable to the custodian HLS server 110 to only have to cut and stream HLS content when a piece of content has not yet been segmented.

Figure 4:
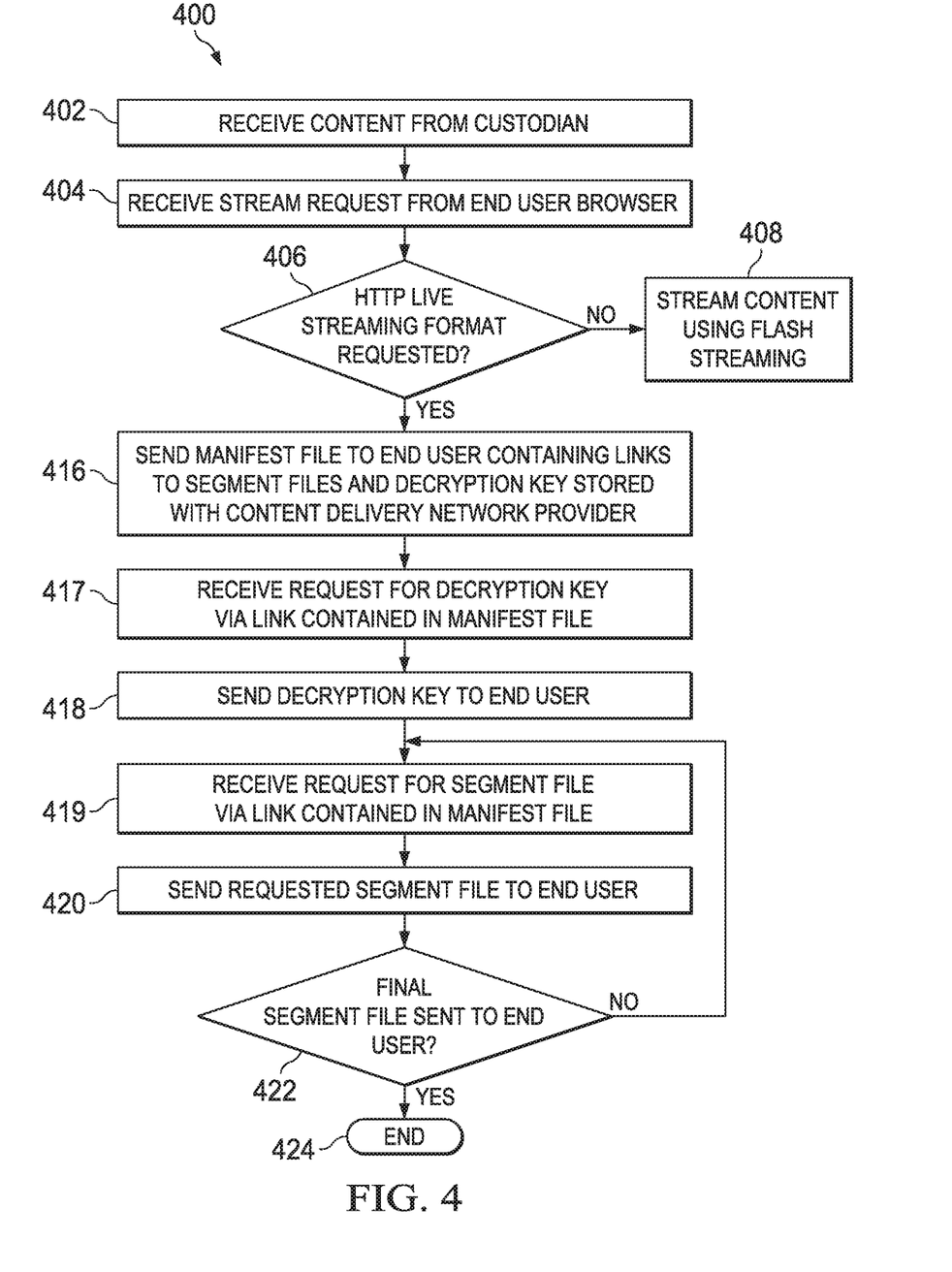
FIG. 4 illustrates a flow diagram of one embodiment of a CDN provider streaming process.

Referring now to FIG. 4, there is illustrated a flow diagram of one embodiment of a CDN provider streaming process 400. At step 402, the CDN provider server(s) 112 receives content form the custodian 103. This content may be source content received from the custodian 103's content provider, or it may be newly segmented content ready to be streaming via HLS streaming. At step 404, the CDN provider server(s) 112 receives a stream request from the end user browser 122. The CDN provider server(s) 112 then determines whether HLS or some other form of streaming is requested, such as Flash. If HLS is not requested, then, at step 408, the CDN provider server(s) 112 streams the non-HLS content according to a non-HLS streaming protocol, such as Flash streaming. If, at step 406, it was determined that HLS streaming is requested, the process moves to step 416. At step 416, the CDN provider server(s) 112 sends a manifest file to the end user browser 122 containing links to segment files and a decryption key stored on the CDN provider server(s) 112. At step 417, the CDN provider server(s) 112 receives a request for the decryption key via the link contained in the manifest file. At step 418, the CDN provider server(s) 112 sends the requested decryption key to the end user browser 122. At step 419, the CDN provider server(s) 112 receives a request from the end user browser 122 for a segment file via the link contained in the manifest file. At step 420, the CDN provider server(s) 112 sends the requested segment file to the end user browser 122. At step 422, it is determined whether the segment file sent in step 420 was the last segment in the manifest file. If it was not the last segment, the process loops back to step 418 to receive a request for the next segment file. If it was the last segment file, the process ends at step 424.

Figure 5A:
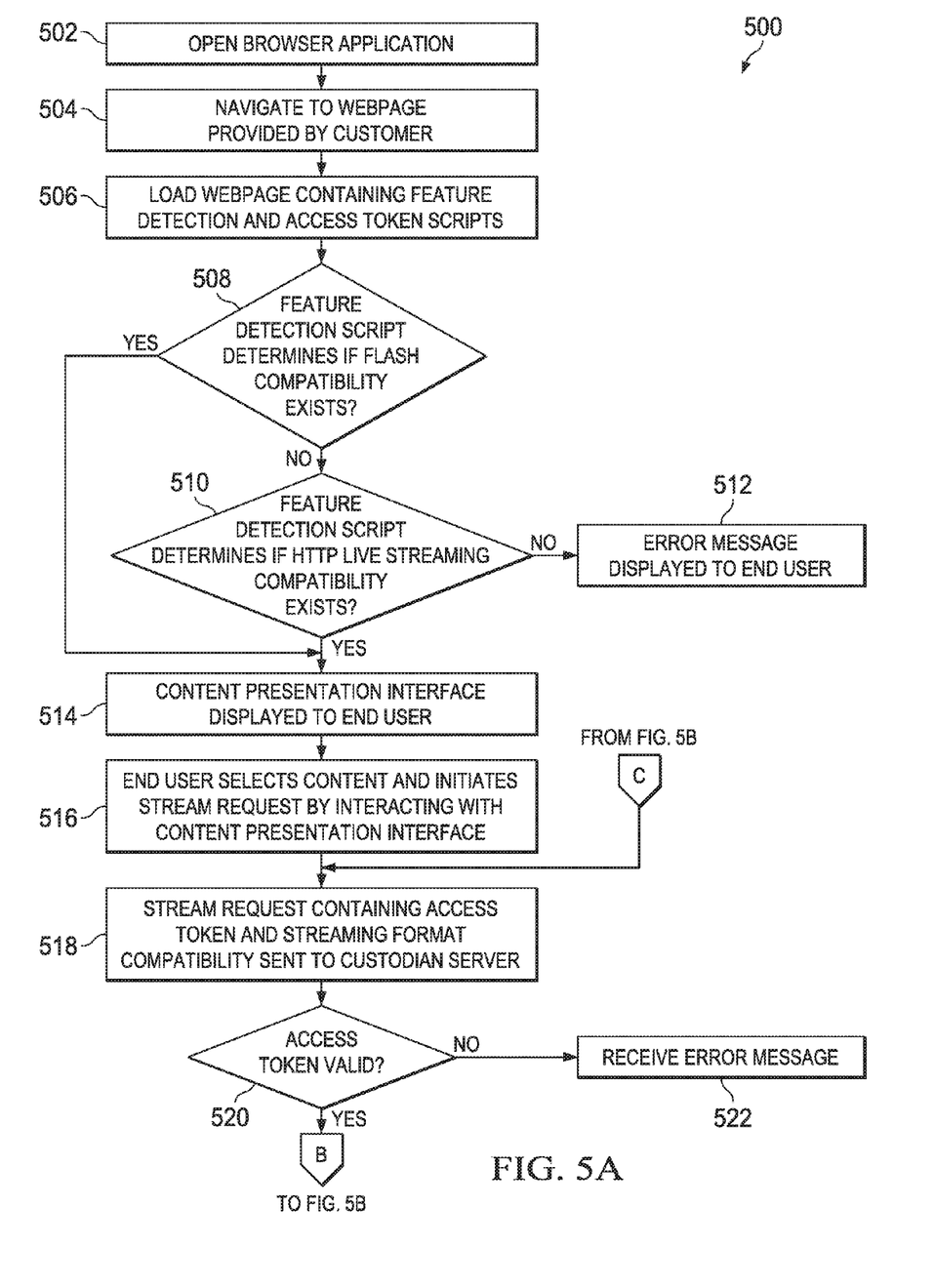
FIG. 5A illustrates a flow diagram of one embodiment of an end user streaming process.
Figure 5B:
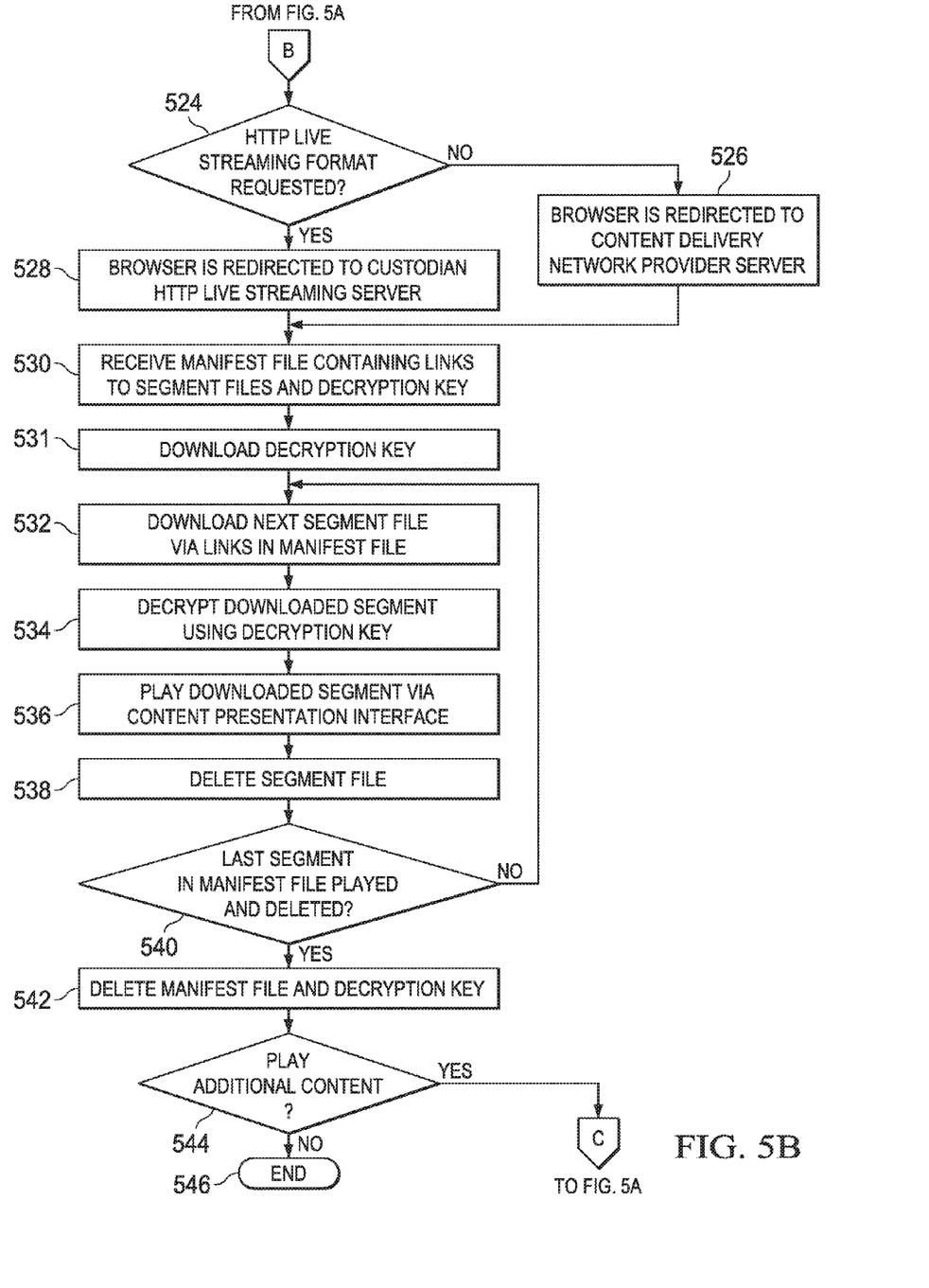
FIG. 5B illustrates a continuation of the flow diagram of FIG. 5A.

Referring now to FIGS. 5A and 5B, there is illustrated a flow diagram of one embodiment of an end user streaming process 500. At step 502, the end user 120 opens the end user browser 122. At step 504, the end user 120 navigates to the customer webpage 118 using the end user browser 122. At step 506, the end user browser 122 loads the customer webpage 118, the customer webpage 118 containing feature detection and access token scripts. At step 508, the feature detection script determines if the end user browser 122 is compatible with Flash streaming. The feature detection scripts are typically written by the custodian 103 and provided to the customer 116 as part of the content presentation interface. The feature detection scripts determine if the end user browser 122 is compatible with available streaming options. For example, if the end user browser 122 is being run on a personal computer (PC), rather than a mobile device, the browser likely supports Flash streaming. The feature detection scripts would detect this compatibility and move forward in the process. On the other hand, if the end user browser 122 is running on a mobile device, or, for some reason, the PC browser is not compatible with Flash streaming, the script will determine if HLS can be used. Thus, feature detection is an important tool for allowing content to be streamed over a wide variety of platforms and browsers.

If the end user browser 122 is compatible with Flash streaming, the process moves on to step 514. If the end user browser 122 is not compatible with Flash streaming, the process moves to step 510, where the feature detection script determines if the end user browser is compatible with HLS streaming. If the end user browser is compatible with HLS streaming, the process moves on to step 514. If the end user browser 122 is not compatible with HLS streaming, an error message is displayed in the end user browser 122. At step 514, a content presentation interface, such as an audio player, is displayed to the end user. At step 516, the end user 120 selects content and initiates a stream request by interacting with the content presentation interface. This may simply include the end user 120 pressing a "play" button. The content presentation interface may also start automatically after the customer webpage 118 is loaded in the end user browser 122 and the appropriate checks in steps 508 and 510 are performed.

At step 518, a stream request including the access token and streaming format compatibility is sent from the end user browser 122 to the custodian server 104. At step 520, if the custodian server 104 determines the access token is invalid, then at step 522 the end user browser 122 receives an error message. If the custodian server 104 determines the access token is valid, the process moves to step 524. At step 524, the custodian server 104 reacts to the streaming format compatibility of the end user browser 122. If the end user browser 122 is requesting Flash content, for example, then at step 526 the end user browser is redirected to the CDN provider server(s) 112. At step 526, the end user browser 122 receives a manifest file from the CDN provider server(s) 112. If, at step 524, HLS streaming is requested, then at step 528 the browser is redirected to the custodian HLS server 110. Then, at step 530, the end user browser 122 downloads a manifest file from the custodian HLS server 110. It will be appreciated that other streaming formats, such as MPEG-Dash, may either follow the same process as HLS streaming, or be streamed via the CDN provider server(s) 112.

Once the end user browser 122 has downloaded a manifest file, whether from the CDN provider server(s) 112 or the custodian HLS server 110, the process progresses to step 531. At step 531, the end user browser 122 downloads a decryption key for use in decrypting segment files. At step 532, the end user browser 122 downloads the next segment file available via links provided in the downloaded manifest file. At step 534, the end user browser 122 decrypts the downloaded segment file using the downloaded decryption key. At step 536, the content presentation interface loaded in the end user browser 122 plays the downloaded and decrypted segment. At step 538, the end user browser deletes the downloaded segment file. At step 540, it is determined whether the segment file downloaded in step 532 and deleted in step 538 was the last segment linked in the manifest file. If it was not the last segment, the process loops back to step 532 to download the next segment file. If, at step 540, it is determined that the segment downloaded in step 532 and deleted in step 538 was the final segment linked in the manifest file, the process moves to step 542 where the manifest file and the decryption key are deleted. It will be appreciated by one skilled in the art that one decryption key may be downloaded for decrypting multiple source content, rather than downloading a new key for each source content. For example, one decryption key may be downloaded for an entire playlist of content, to be used in decrypting each segment associated with each item of content in the playlist.

At step 544 it is determined whether additional content is to be played. If not, the process ends at step 546. If there is additional content to be played, the process loops back to step 518 to send the stream request to the custodian server 104. Additional content may be played for a number of reasons. In some embodiments, the end user 120 may also decide to replay or rewind the content currently being played, such as by pressing a "back" button or by dragging a progress bar back to the beginning of the bar, which would result in needing to request the stream again as the segments already played would likely already be deleted form the end user's machine. In other embodiments, a replay or rewind capability may not be present, depending on how the custodian 103 and the customer 116 prefer the content to be streamed. Additional content may also play if the content presentation interface implements a playlist. In that case, the content presentation interface may move forward to the next piece of content automatically, or the end user 120 may choose to move forward in the playlist manually.

Figure 6A:
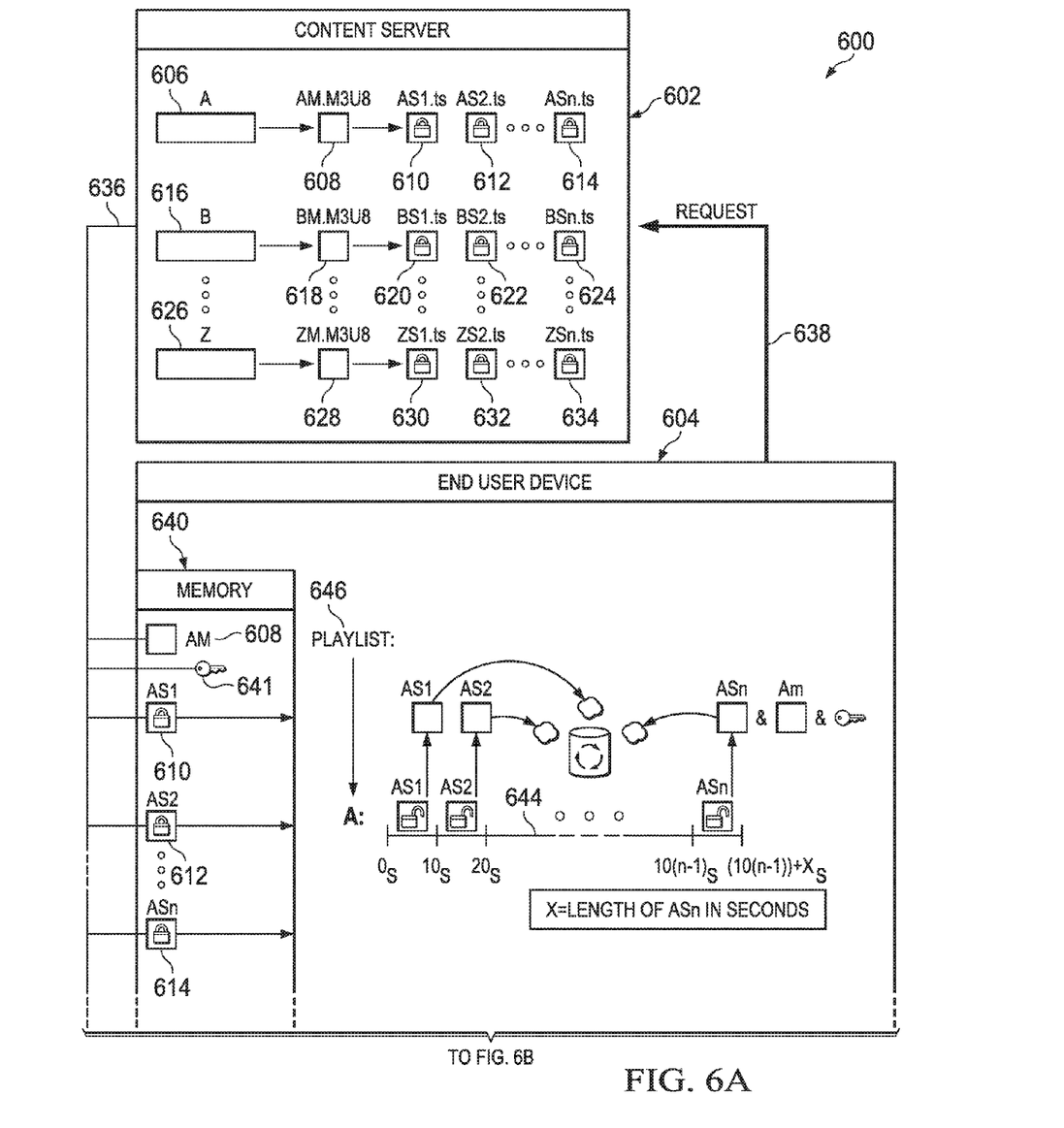
FIG. 6A illustrates a diagrammatic representation of one embodiment of a HLS streaming process.
Figure 6B:
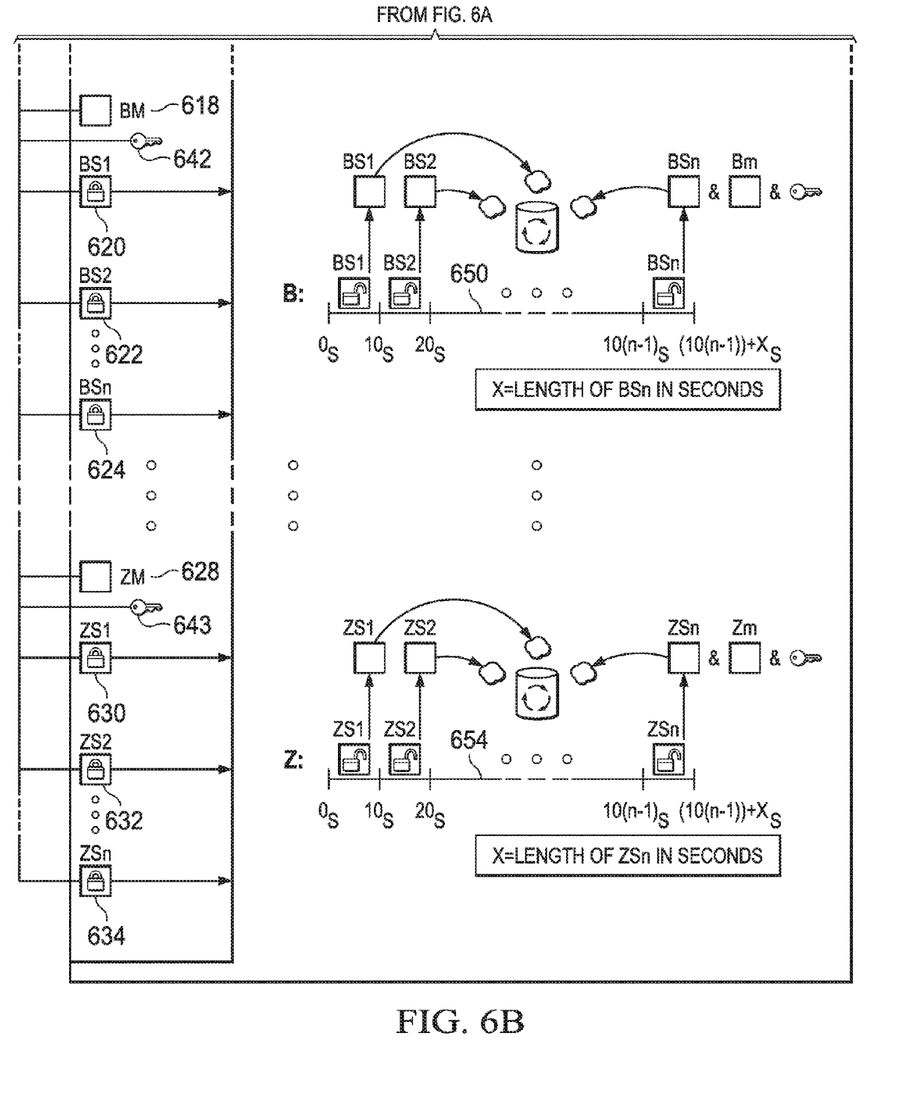
FIG. 6B illustrates a continuation of the diagrammatic representation of the embodiment of the HLS streaming process of FIG. 6A.

Referring now to FIGS. 6A-6B, there is illustrated a diagrammatic representation of one embodiment of a HLS streaming process 600. The HLS streaming process 600 includes a content server 602 and an end user device 604. As shown in FIG. 6A, the server may have any number of individual items of content stored and already segmented. For instance, there is shown in FIG. 6A, a first content ("A") 606. First content ("A") 606, as shown, may already have an associated manifest file ("AM.M3U8") 608. For HLS streaming, manifest files typically have the .M3U8 file extension. Thus, in FIG. 6A the manifest file ("AM.M3U8") 608 is shown as being labeled "AM.M3U8". The first content file ("A") 606 may also already be segmented, with the segments already stored on the content server. As shown in FIG. 6A, the first content file ("A") is shown to have any number of segments, with a first segment file ("AS1.ts") 610, a second segment file ("AS2.ts") 612, and a last segment file ("ASn.ts") 614, each segment file being already encrypted. It will be appreciated that the "n" in the last segment file depicts any number, whichever number would in actuality be the last segment of the first content file ("A") 606. It will also be appreciated by one skilled in the art that each segment would be divided into segments of equal playback length, with the last segment constituting the remainder of the content, however long that may be. The length of each segment may vary based on the content provider 602's preference, but, for the illustrative embodiment, the segment files are divided into 10 seconds each. For example, a song that is 65 seconds in length would be divided into seven segments. The first six segments would be 10 seconds long, while the seventh and last segment would be 5 seconds long.

Additional content would also be stored on the content server 602. As shown in FIG. 6A, there is a second content file ("B") 616, also having a manifest file ("BM.M3U8") 618, a first segment file ("BS1.ts") 620, a second segment file ("BS2.ts") 622, and a last segment file ("BSn.ts") 624, each segment file being already encrypted. There is also shown a final content file ("Z") 626. It will be appreciated that any number of content files may be stored on the content server 602. The final content file ("Z") 626 also has a manifest file ("ZM.M3U8") 628, a first segment file ("ZS1.ts") 630, a second segment file ("ZS2.ts") 632, and a last segment file ("ZSn.ts") 634, each segment file being already encrypted.

When the end user device 604 requests the streaming process to being, as described hereinabove, a download stream 636 is initiated between the end user device 604 and the content server 602. Typically, each item of content would be requested one at a time as the content presentation interface needs require. Thus, the end user device 604 sends a request 638 to the content server 602. The download stream 636 downloads the manifest file ("AM.M3U8") 608 to a memory 640 of the end user device 604. As described hereinabove, a manifest file contains links to each content segment and a link to a decryption key to decrypt each content segment in order for the segment to be played. It will be appreciated by one skilled in the art that there may be one decryption key for all segments of the item of content, or even one decryption key for all content in a playlist. Once the manifest file ("AM.M3U8") 608 is loaded into the memory 640, an associated decryption key, as well as the first segment file ("AS1.ts") 610, the second segment file ("AS2.ts") 612, and all remaining segment files up to the last segment file ("ASn.ts") 614, are downloaded to the memory 640. It will be appreciated by one skilled in the art that each segment file may be loaded into the memory 640 at variable rates, such that many segments may be queued up in the memory 640 at once, downloaded and played one at a time, or any variation thereof, dependent on the speed of the connection between the content server 602 and the end user device 604, as well as other factors. Further, additional content in the playlist may be downloaded, or buffered, into the memory 640, such as the second content file ("B") 616 to the third content filed ("Z") 626. Buffering of additional content, including the manifest files, decryption keys, and file segments associated with the additional content, will vary in degree depending on the available bandwidth. Such buffering of additional content in the playlist allows for uninterrupted and continuous playback of the playlist.

As the segments are successfully downloaded, the segments are loaded into the content presentation interface for playback through the end user device 602. Each segment is decrypted only when it is needed for playback. Thus, the first segment file ("AS1.ts") 610 is decrypted using the associated decryption key 641 that was downloaded at the beginning of the stream, and playback begins. A playback timeline 644 shows that the first segment file ("AS1.ts") 610 is played as the first 10 seconds of the content. Then, as playback of the first segment file ("AS1.ts") 610 is completed, the first segment file ("AS1.ts") 610 is deleted from the memory 640 and the second segment file ("AS2.ts") 612 is decrypted using the associated decryption key 641 and loaded from the memory 640 into the content presentation interface to continue playback. It will be appreciated that these steps preferably happen quickly so that the end user does not experience any delay between the playback of the first segment file ("AS1.ts") 610 and the second segment file ("AS2.ts") 612. This process continues for the rest of the segment files, each segment being decrypted, played, and deleted from the memory 640.

When the last segment file ("ASn.ts") 614 needs to be played, since each preceding segment file was 10 seconds in length, in the illustrative embodiment, the last segment file ("ASn.ts") 614 would begin playing at a time denoted in FIG. 6A as $10(n-1)_s$. For example, if there were 4 segments total, the last segment file ("ASn.ts") 614 would begin playing at $10(4-1)_s$, or 30 seconds, into the playback of the item of content. The last segment file ("ASn.ts") 614 would complete playback at a time denoted as $(10(n-1))+x_s$, where x is the length of the last segment file ("ASn.ts") 614 in seconds. Thus, if the length of the last segment file ("ASn.ts") 614 is 5 seconds, and there are again 4 segments total, playback of the first content ("A") 606 would end at $(10(4-1))+_s$, or 35 seconds, into the playback of the item of content. Once playback of the last segment file ("ASn.ts") 614 is complete, the last segment file ("ASn.ts") 614, the manifest file ("AM.M3U8") 608, and the decryption key 641 are deleted from the memory 640. It will be appreciated that the decryption key may not be deleted in embodiments where there is one decryption key for an entire playlist of content. In that case, the decryption key would not be deleted until the playlist finishes playback, or based on some other criteria, such as time since play stopped.

It will be appreciated by one skilled in the art that, in some embodiments, if the end user manually, via the content presentation interface, moves back to an earlier point in the content being played back, previous segments would be downloaded again for the appropriate point in the content the end user manually moved to in the content, so as to begin playback from that point again. If the end user manually restarted playback of the first content ("A") 606, or if the content presentation interface was set to automatically replay the first content ("A") 606, after playback of the first content ("A") 606 was complete, the request 638 would be resent to the content server 602 to begin the process of playing the first content ("A") 606 again. Such a method of replaying content or moving to a previous portion of content currently being played may not be present in certain embodiments, depending on how the content is chosen to be streamed. It may be desired that the end user not be allowed to replay or rewind content, in which case the streaming of content would simply continue in a predetermined order.

Still referring to FIGS. 6A-6B, the content presentation interface may be set up to provide for playback of a playlist 646. Thus, after playback of the first content ("A") 606 has completed, the content presentation interface may move forward to the next item of content in the playlist 646, or the end user may manually move forward to the next item of content, such as via a forward button on the content presentation interface. It will be understood that, as described hereinabove and in previous figures, there may be a request to the custodian server 104 that takes place before the request 638 to the content server 602 in order to check access tokens, streaming format compatibility, or other factors. The stream of the second content ("B") 616 follows the same process described hereinabove regarding the streaming and playback of the first content ("A") 606. Thus, the manifest file ("BM.M3U8") 618 is downloaded, followed by a decryption key 642, the first segment file ("BS1.ts") 620, the second segment file ("BS2.ts") 622, and the last segment file ("BSn.ts") 624. These items may have already been downloaded during playback of the first content ("A") 606. There is shown a playback timeline 650 depicting the playback of the second content ("B") 616, in the same manner as the playback timeline 644.

After playback of the second content ("B") 616 is complete, the process would perform the same steps for all remaining items of content in the playlist 646, utilizing new decryption keys. The final decryption key 643 is shown in FIG. 6B. After a final request 638 is sent from the end user device 604 to the content server 602, and after playback of the final content ("Z") 626 is complete, as depicted by a playback timeline 654, the process may end. If bandwidth allows, the items downloaded in order to stream the final content ("Z") 626 may already be buffered in the memory 640 before playback of the previous content was complete. However, it will be appreciated by one skilled in the art that the end user may, in some embodiments, via the content presentation interface, loop back to previous items of content, if desired. The content presentation interface may also perform a loop back to the beginning of the playlist 646 automatically. Such functionality allowing the end user to loop back to previous items of content, or the content presentation interface doing such automatically, may not be a feature allowed in certain embodiments, depending on how content is desired to be streamed.

It will be appreciated by one skilled in the art that, in some embodiments, the buffering described in regard to FIGS. 6A and 6B may not be a sequential buffering of all content in the playlist. For instance, some playlists may not necessarily play in sequential order, either by design or because of user input. For example, there may be a replay feature that allows the user to replay a song the user just listened to. In that case, a buffering strategy may be desired that allows for the content most recently played to remain in memory, so that it can be replayed without needing to download the content again. The current item of content would be deleted from memory at a later time, such as after the next item of content has been played, rather than the current item of content being immediately deleted after it is played. In another example, the user may be allowed to choose from a list of content, with the user selecting a new item of content after each item is played. In this case, a portion of each item of content may be buffered, so that, regardless of which item of content the user selects, continuous play may be achieved. The selected item of content would immediately begin playing the portion already buffered, and would begin buffering the remaining portion of the item of content needed to complete playback. Other buffering strategies may be utilized, depending on the nature of how content is desired to be consumed by the user.

Since HLS was developed with video streaming in mind, and under the assumption that video would be consumed one video at a time, HLS did not originally conform to playlist playback. Therefore, HLS does not provide for playlist functionality. Thus, the invention of the present disclosure provides for the content presentation interface to create playlist information, keep track of playlist content, data, and access tokens, and provide information concerning the playlist at the content presentation interface, such as the location in the playlist, the time left in each item of content, and other playlist location indicators. The manifest file contains information concerning each segment file, such as the length, in seconds, of each segment file. This allows the content presentation interface to add the length of each segment file together to display the length of the entire item of content to the end user. The content presentation interface also can determine and display, using the manifest file, the current elapsed time, in seconds, of the content currently being played. This can be accomplished by determining which segment is being played, and many seconds into that segment has been played. For example, if each segment is 10 seconds and 5 seconds have elapsed into the second segment, the content presentation interface determines and displays that the current item of content is at the 15 second mark. It will be understood that the streaming process shown in FIGS. 6A-6B may be applied to other streaming formats, such as Flash, MPEG-Dash, or other streaming formats.

HTTP Live Streaming, given that it is based on HTTP protocol, is less likely to be disallowed by routers, Network Address Translation (NAT), or firewall settings. No ports that are commonly closed by default need to be opened. Content is therefore more likely to get through to the client in more locations and without special settings. HTTP is also supported by more CDNs, a factor that can affect cost in large distribution models. In general, more available hardware and software works unmodified and as intended with HTTP than with RTSP or RTMP. Expertise in customizing HTTP content delivery using tools such as Hypertext Preprocessor (PHP) is also more widespread. Additionally, for large-scale events, HTTP natively and easily supports mirroring and edge caching, providing for massive-scale expansion when needed for the largest events. RTSP and RTMP, protocols for Flash streaming, can also be cached, but HTTP does so natively and without the need for proprietary or custom configurations.

It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A system for content streaming with feature detection, comprising:
    a content server disposed on a location on a network, the content server including content to be streamed; and
    a webpage having a content presentation interface, the content presentation interface providing:
        functionality to facilitate streaming of content to a web browser from the content server;
        feature detection to determine a streaming format compatibility criteria of the web browser to determine if the web browser is HTTP Live Streaming compatible, and, if so:
        a) the content server sends a manifest file containing links to a plurality of encrypted segment files, the plurality of encrypted segment files being associated with all content selections in a list of one or more content selections within the webpage, each content selection including an identification of content, a location of the content server, and an access token, and the manifest file also containing a link to a decryption key associated with all of the plurality of encrypted segment files, for decryption of each of the plurality of encrypted segment files;
        b) the content server sends the decryption key;
        c) the content presentation interface sends a HTTP Live Streaming request for a content selection taken from the list of one or more content selections to the content server;
        d) the content server receives the request and begins a stream for playback via the webpage, wherein the content server sends the plurality of encrypted segment files as they are requested via the links in the manifest file until playback of the content selection requested is complete; and
        e) steps c) and d) are repeated while playback is performed until the last content selection in the list of one or more content selections is requested and streamed, in order to buffer additional content to allow for continuous playback of the list of one or more content selections.

2. The system of claim 1, wherein the streaming format compatibility criteria is Flash streaming.

3. The system of claim 1, wherein the HTTP Live Streaming request further includes the access token.

4. The system of claim 1, wherein the list of one or more content selections is organized in a playlist configured for sending consecutive streaming requests to the content server.

5. The system of claim 1, wherein playback is performed on a mobile device.

6. The system of claim 1, wherein the content to be streamed is audio content.

7. The system of claim 1, wherein the content to be streamed is video content.

8. A method for content streaming with feature detection, comprising:
   storing a source content to be streamed on a content server disposed on a network;
   determining a streaming format compatibility criteria of a remote web browser to determine if the remote web browser is HTTP Live Streaming compatible, and, if so:
   a) sending by a content server a manifest file containing links to a plurality of encrypted segment files, the plurality of encrypted segment files being associated with all content selections in a list of one or more content selections within a webpage loaded in the remote web browser, each content selection including an identification of content, a location of the content server, and an access token, and the manifest file also containing a link to a decryption key associated with all of the plurality of encrypted segment files, for decryption of each of the plurality of encrypted segment files;
   b) sending by the content server the decryption key;
   c) receiving at the content server a HTTP Live Streaming request from the remote web browser for a content selection taken from the list of one or more content selections, the request including the identification of the content and the location of the content server;
   d) streaming the content selection from the content server to the remote web browser via the network, the streaming including
      receiving requests at the content server from the remote web browser for each of the plurality of encrypted segment files associated with the content selection requested; and
      sending from the content server to the remote web browser each one of the requested plurality of encrypted segment files as each request for each of the plurality of encrypted segment files is received; and
   e) repeating steps c) and d) while playback is performed until the last content selection is requested and streamed, in order to buffer additional content to allow for continuous playback of the list of one or more content selections.

9. The method of claim 8, wherein the streaming format compatibility criteria is Flash streaming.

10. The method of claim 8, wherein the HTTP Live Streaming request further includes the access token.

11. The method of claim 8, wherein the list of one or more content selections is organized in a playlist configured for sending consecutive streaming requests to the content server.

12. The system of claim 8, wherein the content to be streamed is audio content.

13. The system of claim 8, wherein the content to be streamed is video content.

14. A method for content streaming with feature detection, comprising:
    navigating to a webpage via a web browser, the webpage including a content presentation interface and the content presentation interface containing feature detection;
    loading the webpage in the web browser;
    detecting, via the feature detection, a streaming format compatibility criteria of the web browser to determine if the web browser is HTTP Live Streaming compatible, and, if so:
    a) receiving by the web browser a manifest file containing links to a plurality of encrypted segment files, the plurality of encrypted segment files being associated with all content selections in a list of one or more content selections within the webpage, each content selection including an identification of content, a location of a content server, and an access token, and the manifest file also containing a link to a decryption key associated with all of the plurality of encrypted segment files, for decryption of each of the plurality of encrypted segment files;
    b) requesting and receiving the decryption key;
    c) sending from the web browser a HTTP Live Streaming request for a content selection taken from the list of one or more content selections, including the streaming format compatibility criteria, an identification of content, and a location of the content server;
    d) receiving streaming content, the operation of streaming content including
       sending requests for each of the plurality of encrypted segment files,
       receiving from the content server each one of the requested plurality of encrypted segment files,
       decrypting each one of the received plurality of encrypted segment files, only when playback of each one of the plurality of encrypted segments files is to begin, using the received decryption key, resulting in a plurality of decrypted segment files,
       playing, via the content presentation interface, each one of the plurality of decrypted segment files in consecutive order, and
       deleting, as each one of the plurality of decrypted segment files finishes playback, each one of the plurality of decrypted segment files; and
    e) repeating steps c) and d) while playback is performed until the last content selection is requested and streamed, in order to buffer additional content to allow for continuous playback of the list of one or more content selections.

15. The method of claim 14, wherein the streaming format compatibility criteria is Flash streaming.

16. The method of claim 14, wherein the HTTP Live Streaming request further includes the access token.

17. The method of claim 14, wherein the list of one or more content selections is organized in a playlist configured for sending consecutive streaming requests to the content server.

18. The method of claim 14, wherein playback is performed on a mobile device.

19. The system of claim 14, wherein the content to be streamed is audio content.

20. The system of claim 14, wherein the content to be streamed is video content.

* * * * *